(12) United States Patent
Hirai

(10) Patent No.: US 7,420,325 B2
(45) Date of Patent: Sep. 2, 2008

(54) DISPLAY DEVICE

(75) Inventor: Masaaki Hirai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 11/139,662

(22) Filed: May 31, 2005

(65) Prior Publication Data

US 2005/0264191 A1 Dec. 1, 2005

(30) Foreign Application Priority Data

May 31, 2004 (JP) ............................ 2004-160491

(51) Int. Cl.
*H01J 1/62* (2006.01)
(52) U.S. Cl. ...................... 313/506; 313/498
(58) Field of Classification Search .................. 313/506, 313/509, 498, 503
See application file for complete search history.

(56) References Cited

FOREIGN PATENT DOCUMENTS

| JP | 1-236596 A | 9/1989 |
|---|---|---|
| JP | 5-54972 | 3/1993 |
| JP | 6-325870 A | 11/1994 |
| JP | 2003-017263 A | 1/2003 |

OTHER PUBLICATIONS

Japanese Notice of Rejection and English translation thereof mailed Nov. 27, 2007, in corresponding Japanese application No. 2004-160491.

*Primary Examiner*—Vip Patel
(74) *Attorney, Agent, or Firm*—Nixon & Vanderhye P.C.

(57) ABSTRACT

A display device includes a substrate, a plurality of first electrodes, a light-emitting lamination, a plurality of second electrodes, and one or more protruding layers. The plurality of first electrodes extend in parallel to each other on the substrate. The light-emitting lamination covers the plurality of first electrodes. The plurality of second electrodes extend across the light-emitting lamination and extend in parallel to each other at an angle with respect to an extending direction of the first electrodes. The one or more protruding layers are formed on the substrate and protrude from a side end of the light-emitting lamination in an extending direction of the second electrodes. Respective portions of the plurality of second electrodes which extend outside of the light-emitting lamination are formed on the one or more protruding layers.

9 Claims, 5 Drawing Sheets

DISPLAY DEVICE

CROSS REFERENCE TO RELATED APPLICATIONS

This application claims priority under 35 U.S.C. §119 on Patent Application No. 2004-160491 filed in Japan on May 31, 2004, the entire contents of which are hereby incorporated by reference.

BACKGROUND OF THE INVENTION

1. Field of the Invention

The present invention relates to a display device.

2. Description of the Background Art

Flat panel display devices have less power consumption than that of conventionally used cathode ray tubes (CRTs) and enable reduction in thickness of display devices. Flat panel display devices have been increasingly demanded in response to recent diversification of information processing equipments. Examples of such flat panel display devices include liquid crystal display devices and electroluminescent (EL) display devices. In particular, inorganic EL display devices are characterized by their all solid-state structure, faster response speed, and self light emission. Inorganic EL display devices have been actively studied and developed due to these characteristics.

An inorganic EL display device generally has a substrate, first electrodes, a light-emitting lamination, and second electrodes. The light-emitting lamination has a light-emitting layer and insulating layers with the light-emitting layer interposed therebetween. The first electrodes have a stripe shape and are formed on the substrate. The light-emitting lamination is formed on the first electrodes. The second electrodes have a stripe shape and extend perpendicular to the first electrodes. The second electrodes extend across the light-emitting lamination. Each second electrode has a second-electrode extending portion formed outside the light-emitting lamination.

In the inorganic EL display device having the above structure, thinning or disconnection may occur at the second-electrode extending portions during the manufacturing process.

Such thinning or disconnection of the second-electrode extending portions can be suppressed by increasing the width of the second-electrode extending portions. However, the distance between adjacent second electrodes must be increased in order to increase the width of the second-electrode extending portions. It is therefore difficult to implement a high-definition inorganic EL display device.

SUMMARY OF THE INVENTION

It is an object of the present invention to provide a high-definition display device having reliable electric connection between second electrodes and first electrodes.

A display device according to the present invention includes a substrate, a plurality of first electrodes, a light-emitting lamination, a plurality of second electrodes, and one or more protruding layers. The plurality of first electrodes extend in parallel to each other on the substrate. The light-emitting lamination covers the plurality of first electrodes. The plurality of second electrodes extend across the light-emitting lamination. The plurality of second electrodes extend in parallel to each other at an angle with respect to an extending direction of the first electrodes. The one or more protruding layers are formed on the substrate. The one or more protruding layers protrude from a side end of the light-emitting lamination in an extending direction of the second electrodes. Respective portions of the plurality of second electrodes which extend outside of the light-emitting lamination are formed on the one or more protruding layers.

In the display device of the present invention, a thickness of the one or more protruding layers may be about 1/10 to about 1/2 of a thickness of the light-emitting lamination.

In the display device of the present invention, a protruding length of the one or more protruding layers may be about 2 mm or more.

In the display device of the present invention, the one or more protruding layers may be covered by the respective portions of the plurality of second electrodes which extend outside of the light-emitting lamination.

In the display device of the present invention, the one or more protruding layers may be formed from a same material as that of the first electrodes.

The display device of the present invention may be of an inorganic luminescent display type.

DETAILED DESCRIPTION OF THE INVENTION

Hereinafter, embodiments of the present invention will be described in detail with reference to the drawings.

Figure 1:
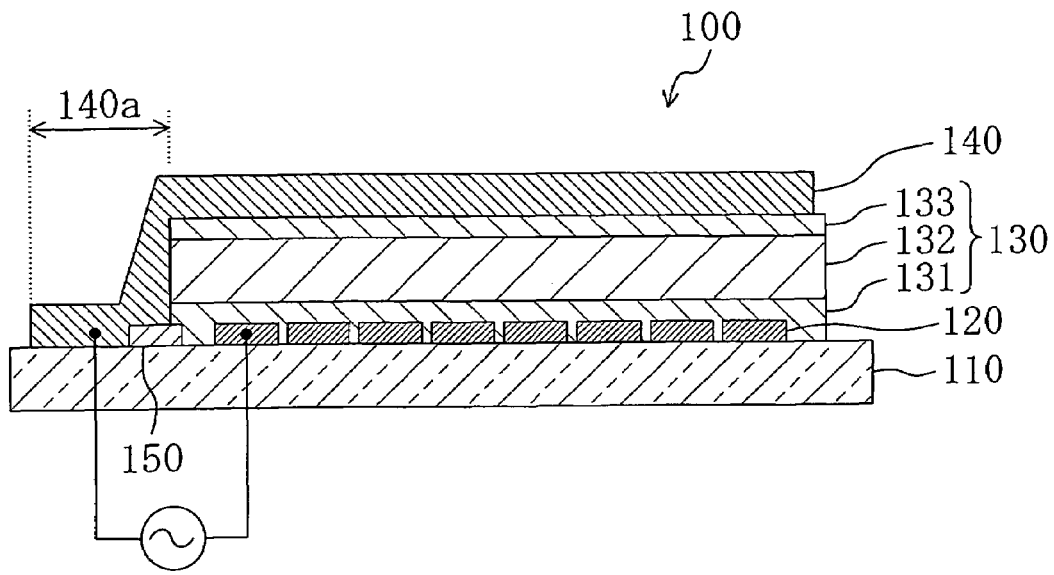
FIG. 1 is a cross-sectional view of an inorganic electroluminescent (EL) display device of the present invention.
Figure 2:
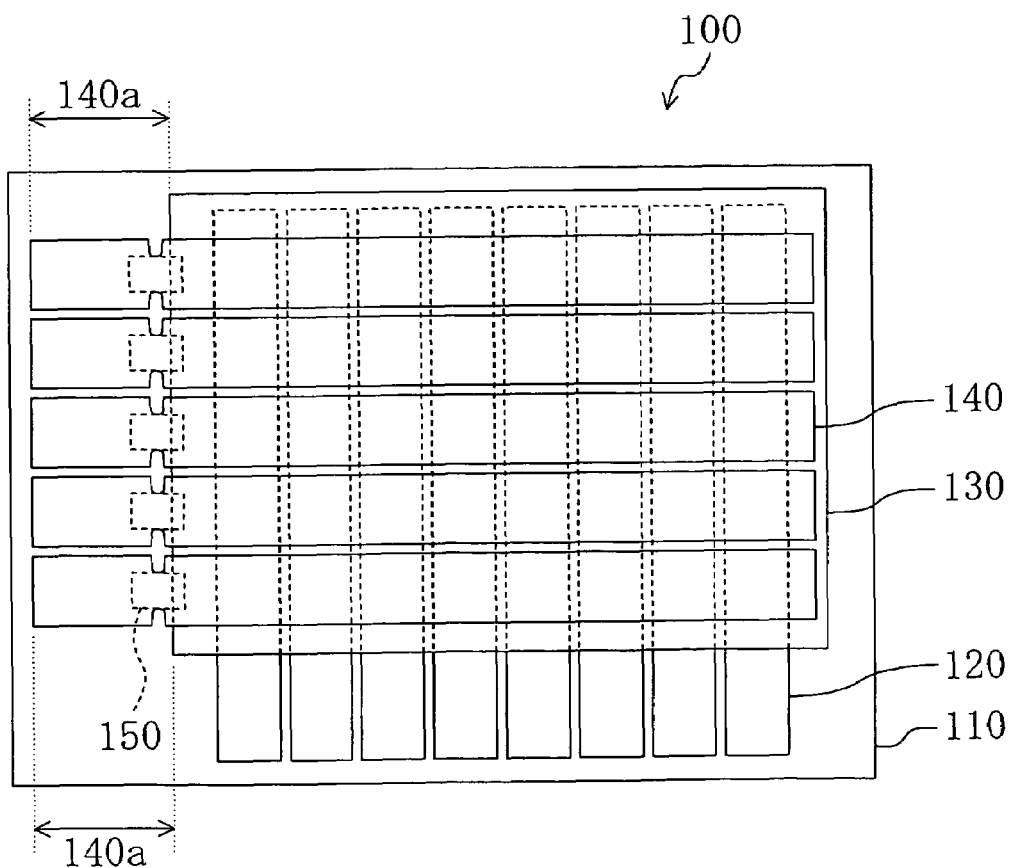
FIG. 2 is a plan view of the inorganic EL display device of the present invention.

FIG. 1 is a cross-sectional view of an inorganic electroluminescent (EL) display device 100 of the present invention. FIG. 2 is a plan view of the inorganic EL display device 100 of the present invention.

The inorganic EL display device 100 includes a substrate 110, a plurality of first electrodes 120, a light-emitting lamination 130, a plurality of second electrodes 140, and a plurality of protruding layers 150. The plurality of first electrodes 120 extend in parallel to each other on the substrate 110. The light-emitting lamination 130 covers the plurality of first electrodes 120. The plurality of second electrodes 140 extend across the light-emitting lamination 130. The plurality of second electrodes 140 extend in parallel to each other. The plurality of first electrodes 120 extend at an angle with respect to the extending direction of the plurality of second electrodes 140. The protruding layers 150 are formed on the substrate 110. The protruding layers 150 protrude from a side end of the light-emitting lamination 130 in the extending direction of the second electrodes 140. Respective portions 140a of the plurality of second electrodes 140 which extend outside of the light-emitting lamination 130 (hereinafter, referred to as "second-electrode extending portions 140a") are formed on the respective protruding layers 150.

The light-emitting lamination 130 has a light-emitting layer 132, a first insulating layer 131, and a second insulating layer 133. The light-emitting layer 132 is interposed between the first insulating layer 131 and the second insulating layer 133.

In the inorganic EL display device 100, the first electrodes 120 and the second electrodes 140 apply a high electric field to the light-emitting layer 132. Luminescent centers such as $Mn^{2+}$ included in the light-emitting layer 132 are excited in response to the voltage application. Light is emitted when the luminescent centers thus excited are deactivated to ground state.

The substrate 110 can be formed from any material as long as the substrate 110 has an insulating property and as long as the substrate 110 is capable of assuring mechanical strength of the inorganic EL display device 100. For example, the substrate 110 can be formed from high-temperature burned ceramics, crystallized glass, or glass. Examples of high-temperature burned ceramics include alumina ($Al_2O_3$) and forsterite ($2MgO/SiO_2$). An example of glass is quartz glass.

The first electrodes 120 and the second electrodes 140 apply a voltage to the light-emitting lamination 130. For example, the first electrodes 120 and the second electrodes 140 can be formed from a metal material or a transparent conductive material. Examples of the metal material include gold (Au), silver-palladium (Ag—Pd), and nickel (Ni). Examples of the transparent conductive material include indium tin oxide (ITO) and indium zinc oxide (IZO).

For specific resistance, the first electrodes 120 and the second electrodes 140 preferably have a thickness of 0.05 µm to 5 µm.

The first electrodes 120 and the second electrodes 140 may be formed either from different materials or the same material.

The first insulating layer 131 and the second insulating layer 133 function to prevent dielectric breakdown of the inorganic EL display device 100 and to increase the amount of charges which are supplied to the light-emitting layer 132. Accordingly, the first insulating layer 131 and the second insulating layer 133 preferably have a high dielectric constant (about 4 or more) and a high electric insulating property (e.g., an insulation resistance value of about $1\times10^8$ Ω or more).

For example, the first insulating layer 131 and the second insulating layer 133 are formed from a nitride material, an oxide material, a composite material, or the like. An example of the nitride material is $Si_3N_4$. Examples of the oxide material include $SiO_2$, $Ta_2O_5$, and $Al_2O_3$. Examples of the composite material include barium titanate ($BaTiO_3$) and a lead-containing relaxor ($Pb(Nb)_x(Mg)_yO_3$).

In order to suppress dielectric breakdown effectively, each of the first insulating layer 131 and the second insulating layer 133 preferably has a thickness of about 0.1 µm to about 30 µm.

The light-emitting layer 132 includes a base material and luminescent centers dispersed in the base material. The base material protects the luminescent centers. The luminescent centers are excited by the voltage applied by the first electrodes 120 and the second electrodes 140 and return to ground state with light emission.

Examples of the luminescent centers include manganese (Mn) ions, copper (Cu) ions, and rare-earth ions.

Examples of the base material include zinc sulfide (ZnS), strontium sulfide (SrS), $SrGaS_4$, and $BaAl_2S_4$.

For example, orange light emission is obtained when manganese (Mn) is used as the luminescent centers and zinc sulfide (ZnS) is used as the base material. Blue light emission is obtained when copper (Cu) is used as the luminescent centers and strontium sulfide (SrS) is used as the base material.

The protruding layers 150 protrude from a side end of the light-emitting lamination 130 in the extending direction of the second electrodes 140. The protruding layers 150 are formed between the second-electrode extending portions 140a and the substrate 110. In this inorganic EL display device 100, the protruding layers 150 overlap the light-emitting lamination 130. However, the present invention is not limited to this structure as long as the protruding layers 150 are not separated from the light-emitting lamination 130.

Note that, in the inorganic EL display device 100 of the present embodiment, the protruding layer 150 is formed as a plurality of layers which are separated from each other. However, the protruding layer 150 may alternatively be formed as a single integral layer.

For example, the protruding layers 150 are formed from an oxide material (such as $SiO_2$), a metal material (such as nickel (Ni)), or the like. The protruding layers 150 are preferably formed from a conductive material. By forming the protruding layers 150 from a conductive material, thinning and disconnection of the second electrodes 140 during the manufacturing process can be effectively suppressed.

In order to suppress thinning and disconnection of the second electrodes 140 during the manufacturing process more effectively, the protruding layers 150 are preferably formed from a material which is less likely to be etched by an etchant than the second electrodes 140 are.

The protruding layers 150 may be formed from the same material as that of the first electrodes 120. In this case, the first electrodes 120 and the protruding layers 150 can be formed simultaneously. More specifically, the first electrodes 120 and the protruding layers 150 can be formed simultaneously by forming a thin film from a material of the first electrodes 120 on the substrate 110 and patterning the thin film into the first electrodes 120 and the protruding layers 150 by a photolithography technology or the like. The inorganic EL display device 100 can thus be implemented at lower costs with a smaller number of manufacturing steps.

Hereinafter, a method for manufacturing the inorganic EL display device 100 will be described.

First, a conductive thin film (e.g., a nickel thin film) is formed on the substrate 110 by a vapor deposition method or the like. The conductive thin film thus formed is patterned into a desired stripe shape by using a photolithography technology or the like. The first electrodes 120 are thus formed.

More specifically, the conductive thin film is coated with photoresist or the like by a spin coating method or the like. The photoresist film thus formed is patterned into the same shape as a desired shape of the first electrodes 120 by exposure and development. The conductive thin film is then etched by using the patterned photoresist film as a mask. In this etching process, the photoresist film patterned into the same shape as that of the first electrodes 120 functions as a protective film of the conductive thin film. Therefore, the portion of the conductive thin film which is located between the photoresist film and the substrate 110 (the portion covered by the photoresist film) is not etched. As a result, the first electrodes 120 having a desired stripe shape are obtained. The first electrodes 120 are completed by removing the photoresist film on the first electrodes 120.

The protruding layers 150 are then formed. The protruding layers 150 are obtained by forming a thin film by a spin coating method or the like and patterning the thin film by a photolithography method or the like.

When the protruding layers 150 are formed from the same material as that of the first electrodes 120, the first electrodes 120 and the protruding layers 150 can be simultaneously formed by patterning the same thin film. Accordingly, the inorganic EL display device 100 can be manufactured at lower cost with a smaller number of manufacturing steps.

The first insulating layer 131 including $Si_3N_4$ or the like is then formed by a sputtering method or the like. More specifically, a mask is formed on the substrate 110 other than the region where the first insulating layer 131 is to be formed. For example, the mask is formed from ceramics (such as alumina ($Al_2O_3$)), glass, metal (such as stainless steel and brass), or the like. The first insulating layer 131 is then formed by a sputtering method.

The light-emitting layer 132 including ZnS:Mn or the like and the second insulating layer 133 including $Si_3N_4$ or the like are formed by a sputtering method or the like.

The second electrodes 140 are then formed. More specifically, a conductive thin film such as indium tin oxide (ITO) is formed by a sputtering method or the like. The conductive thin film thus formed is patterned by a photolithography technology or the like. The second electrodes 140 are thus formed.

The inorganic EL display device 100 of the present embodiment has the protruding layers 150 which protrude from a side end of the light-emitting lamination 130 in the extending direction of the second electrodes 140. This structure can suppress over-etching of the second-electrode extending portions 140a when the conductive thin film is patterned into the second electrodes 140. This structure can therefore suppress thinning and disconnection of the second-electrode extending portions 140a during the manufacturing process.

Since thinning and disconnection of the second-electrode extending portions 140a during the manufacturing process can be suppressed, the second-electrode extending portions 140a need not be made wider than the second electrodes 140 formed on the light-emitting lamination 130. Accordingly, the distance between the second electrodes 140 can be reduced and a higher definition inorganic EL display device 100 can be implemented.

Hereinafter, the step of forming the light-emitting lamination 130 and the second electrodes 140 in the inorganic EL display device 100 will be described in more detail with reference to the drawings.

FIGS. 3A to 3D are cross-sectional views illustrating the step of forming the light-emitting lamination 130 on the substrate 110.

Figure 3A:
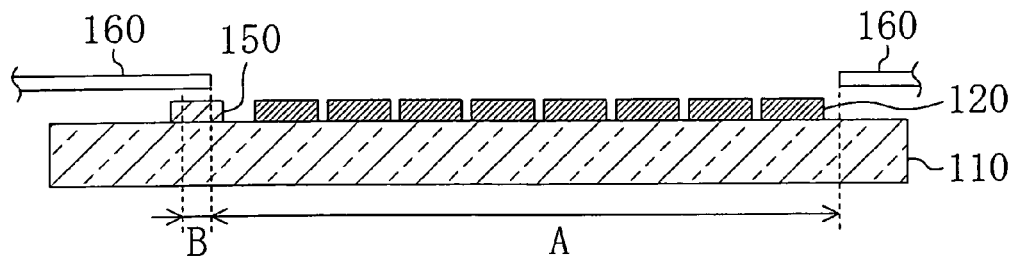
FIG. 3A is a cross-sectional view illustrating the step of forming a mask on a substrate having first electrodes and protruding layers formed thereon.

FIG. 3A illustrates the step of forming a mask 160 on the substrate 110 having the first electrodes 120 and the protruding layers 150 formed thereon.

Figure 3B:
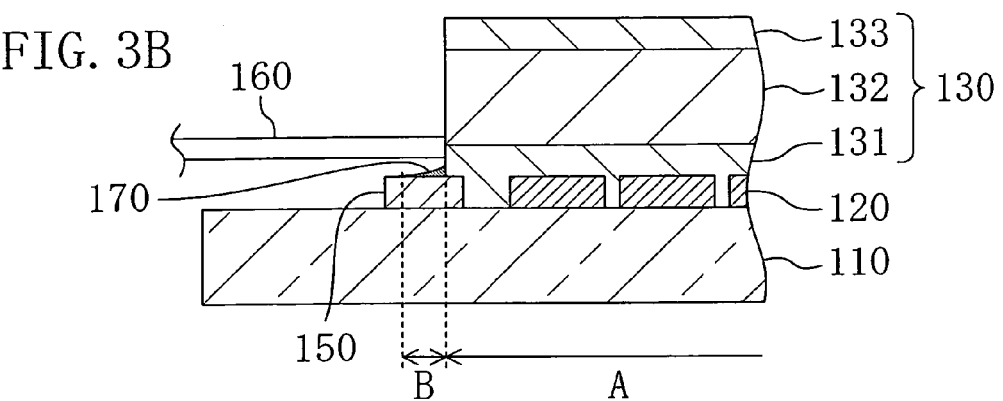
FIG. 3B is a cross-sectional view illustrating the step of forming a light-emitting lamination.

FIG. 3B illustrates the step of forming the light-emitting lamination 130.

Figure 3C:
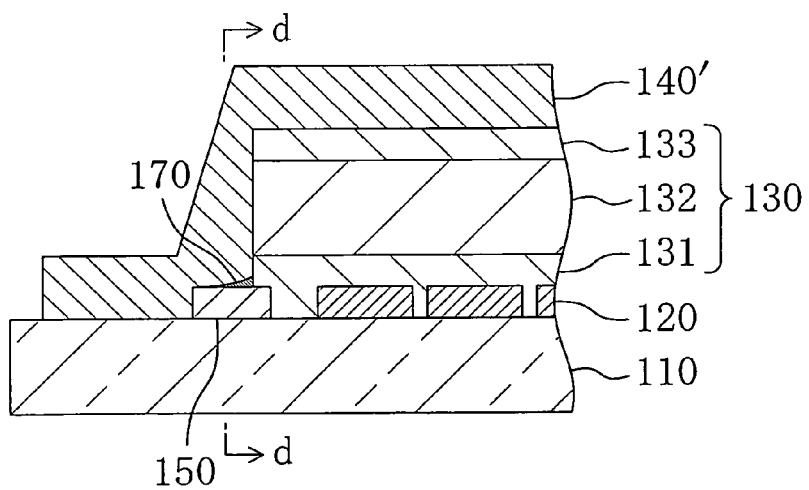
FIG. 3C is a cross-sectional view illustrating the step of forming a conductive film.

FIG. 3C illustrates the step of forming a conductive film 140'.

Figure 3D:
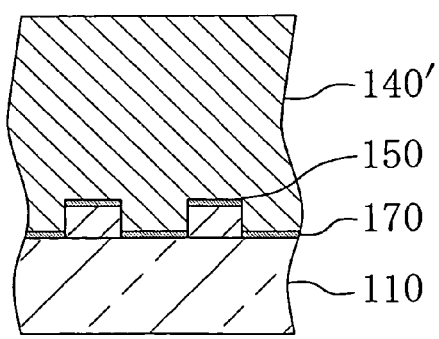
FIG. 3D is a cross-sectional view taken along line d-d in FIG. 3C.

FIG. 3D shows a cross section taken along line d-d in FIG. 3C.

As shown in FIG. 3A, a mask 160 is formed on the substrate 110 other than a light-emitting lamination formation region A (a region where the light-emitting lamination 130 is to be formed). This mask 160 prevents a material of the light-emitting lamination 130 such as $SiO_2$ from being deposited on the region other than the light-emitting lamination formation region A. By using the mask 160, the light-emitting lamination 130 is formed by a sputtering method or the like.

It is difficult to form the mask 160 completely in close contact with the substrate 110 and there is a slight clearance between the substrate 110 and the mask 160. The material of the light-emitting lamination 130 such as $SiO_2$ therefore enters the clearance between the substrate 110 and the mask 160. Accordingly, the material of the light-emitting lamination 130 such as $SiO_2$ is deposited also in a peripheral region B of the mask 160, and a deposited layer 170 is formed. The deposited layer 170 is a layer formed from the material of the light-emitting lamination 130 entering the clearance between the mask 160 and the substrate 110. The deposited layer 170 therefore has a low volume density.

In the inorganic EL display device 100 of the present embodiment, the protruding layers 150 are formed in advance in the peripheral region B of the mask 160. As shown in FIG. 3B, the deposited layer 170 is therefore formed on each protruding layer 150. As shown in FIG. 3C, the deposited layer 170 having a low volume density is formed between a conductive layer 140' (such as ITO) and each protruding layer 150 in the peripheral region B.

FIGS. 4A to 4D are cross-sectional views illustrating the step of forming the second electrodes 140 by patterning the conductive film 140' by a photolithography technology.

Figure 4A:
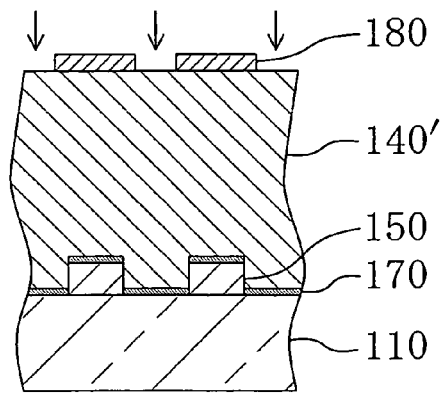
FIG. 4A is a cross-sectional view illustrating the step of forming a photoresist layer.

FIG. 4A illustrates the step of forming a photoresist layer 180.

Figure 4B:
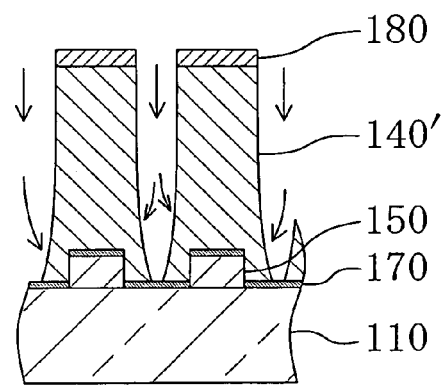
FIGS. 4B and 4C are cross-sectional views illustrating the step of etching a conductive film by using an etchant.
Figure 4C:
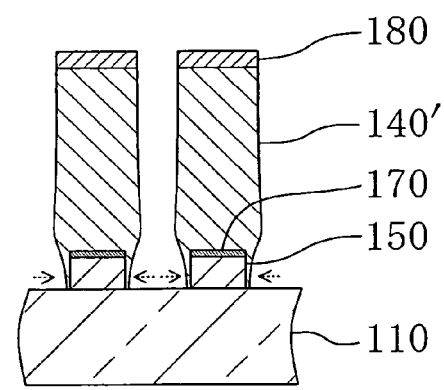

FIGS. 4B and 4C illustrate the step of etching the conductive film 140' by using an etchant.

Figure 4D:
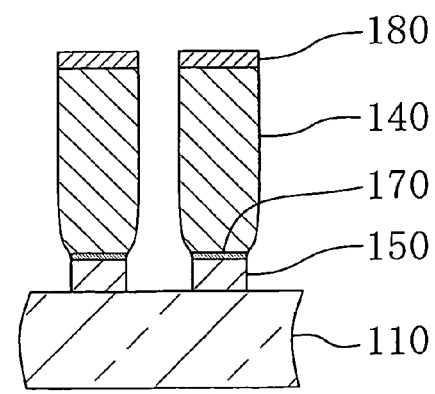
FIG. 4D is a cross-sectional view illustrating the shape of second electrodes.

FIG. 4D shows the shape of the second electrodes 140.

As shown in FIG. 4A, a thin film of a photoresist material is formed by a spin coating method or the like. The thin film is then exposed and developed to form a photoresist layer 180 having the same shape as that of the second electrodes 140.

As shown in FIGS. 4B and 4C, the conductive film 140' is patterned into the second electrodes 140 by etching with an etchant. The second electrodes 140 are completed by removing the photoresist layer 180.

The photoresist layer 180 is normally formed from a material which is less likely to be etched by an etchant. Therefore, as shown in FIG. 4B, the conductive film 140' is etched from the region which is not covered by the photoresist layer 180. As the etching proceeds and the etchant reaches the deposited layer 170, the deposited layer 170 is etched at a higher rate than the conductive film 140' is etched. This is because the deposited layer 170 has a low volume density and an extremely low resistance to etching. As shown in FIG. 4C, the conductive film 140' is therefore etched both from the side and bottom surfaces.

However, the inorganic EL display device 100 has the protruding layers 150 on the substrate 110. The protruding layers 150 are formed on the substrate 110 before the light-emitting lamination 130 is formed. Accordingly, the deposited layer 170 is not present between the protruding layers 150 and the substrate 110, and the protruding layers 150 firmly bond with the substrate 110. The protruding layers 150 are not etched at such a high rate as that of the deposited layer 170. The protruding layers 150 thus prevent over-etching of the conductive film 140'.

After hard study and research, the inventor found that the deposited layer 170 formed on the protruding layers 150 is less likely to be etched in an etching process. Accordingly, in the inorganic EL display device 100, thinning and disconnection during the manufacturing process are effectively suppressed in the regions of the second-electrode extending portions 140a which are formed on the deposited layer 170.

In order to suppress over-etching more effectively, the thickness of the protruding layers 150 is preferably about 1/10 or more of the thickness of the light-emitting lamination 130.

The thickness of the protruding layers 150 is preferably about a half or less of the thickness of the light-emitting lamination 130. The above-mentioned effect of preventing over-etching can be sufficiently obtained even when the thickness of the protruding layers 150 is about a half or less of the thickness of the light-emitting lamination 130. When the thickness of the protruding layers 150 exceeds about a half of the thickness of the light-emitting lamination 130, the time required to form the light-emitting lamination 130 is increased. This reduces productivity of the inorganic EL display device 100. More preferably, the thickness of the protruding layers 150 is about 1/10 to about 1/5 of the thickness of the light-emitting lamination 130.

Preferably, the protruding length of the protruding layers 150 is about 2 mm or more. After hard study and research, the inventor found that the deposited layer 170 is deposited mainly within about 2 mm from the peripheral edge of the light-emitting lamination 130. Accordingly, by forming the protruding layers 150 having a protruding length of about 2 mm or more, the deposited layer 170 can be prevented from being deposited on the region other than the protruding layers 170. As a result, disconnection of the second electrodes 140 can be more reliably prevented. More preferably, the protruding length of the protruding layers 150 is about 0.5 mm or more.

The protruding layers 150 may be covered by the portions of the second electrodes 140 which extend outside of the light-emitting lamination 130. This structure prevents the protruding layers 150 from being directly exposed to an etchant when the second electrodes 140 are formed by patterning.

FIGS. 5A to 5E are plan views showing variations of the shape of the protruding layer 150.

Figure 5A:
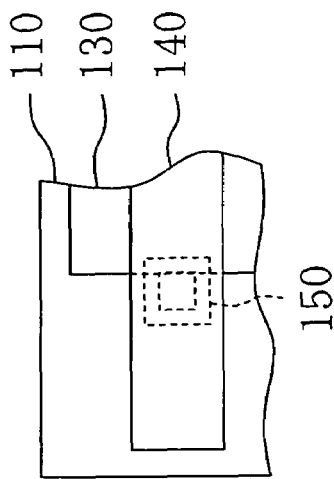
FIGS. 5A, 5B, 5C, 5D, and 5E are plan views showing variations of the shape of the protruding layers.

As shown in FIG. 5A, the protruding layer 150 may protrude from the second electrode 140.

Figure 5D:
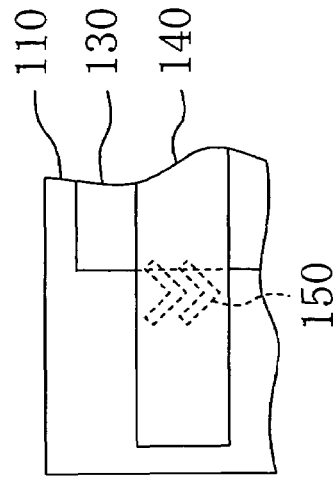
Figure 5B:
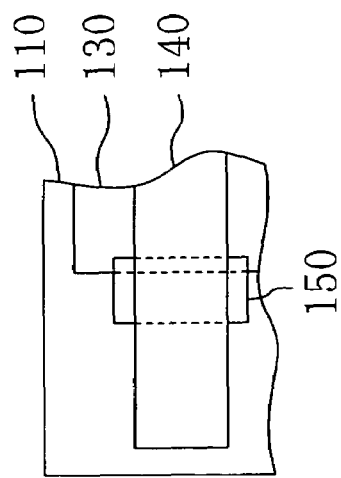

As shown in FIG. 5B, the protruding layer 150 may be a plurality of bars extending in parallel to each other. This structure can more effectively suppress over-etching of the portion of the second electrode 140 which is interposed between the plurality of bars. As a result, thinning and disconnection of the second-electrode extending portions 140a can be effectively suppressed.

Figure 5E:
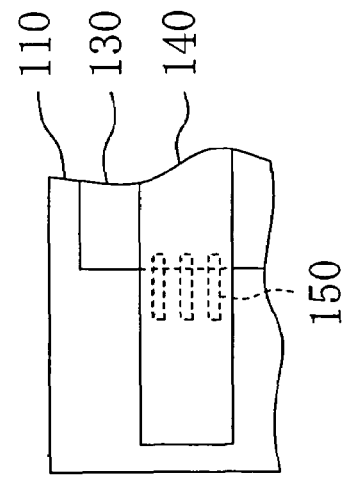
Figure 5C:
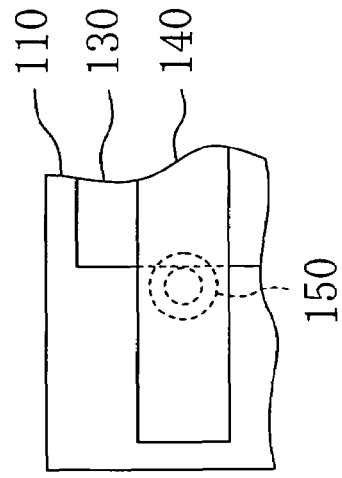

For the same reason, the protruding layer 150 may have a ring shape or a hollow quadrangular or hollow polygonal shape when viewed two-dimensionally, as shown in FIGS. 5C and 5D. As shown in FIG. 5E, the protruding layer 150 may be a plurality of "V-shaped" bars extending in parallel to each other.

An inorganic EL display device has been described in the present embodiment. However, the display device of the present invention is not limited to an inorganic EL display device. The present invention is also applicable to display devices such as an organic EL display device, an FED (Field Emission Display), a PDP (Plasma Display Panel), and the like.

EXAMPLE

Hereinafter, an inorganic EL display device having the same structure as that of the inorganic EL display device 100 of the above embodiment will be described as an example.

In the inorganic EL display device 100 of this example, the respective thicknesses of the first electrodes 120, the protruding layers 150, the first insulating layer 131, the light-emitting layer 132, the second insulating layer 133, and the second electrodes 140 were 15 nm, 15 nm, 25 nm, 80 nm, 15 nm, and 50 nm. The thickness of the protruding layers 150 was about 1/8 of the thickness of the light-emitting lamination 130. The protruding length of the protruding layers 150 was 2.0 nm.

First, a film of indium tin oxide (ITO) was formed on the glass substrate 110 by a sputtering method. The first electrodes 120 and the protruding layers 150 were simultaneously formed by patterning the ITO film into a desired shape by a photolithography technology.

The first insulating layer 131 was formed by a sputtering method. The first insulating layer 131 was formed from an $Si_xN_4$ thin film and an $SiO_2$ thin film. The light-emitting layer 132 of ZnS:Mn was formed by a vapor deposition method. The second insulating layer 133 was formed by a sputtering method. The second insulating layer 133 was formed from an $Si_3N_4$ thin film and an $SiO_2$ thin film.

A film of indium tin oxide (ITO) was then formed by a sputtering method. The second electrodes 140 were formed by patterning the ITO film into a desired shape by a photolithography technology. A mixed solution of hydrochloric acid and ferric chloride was used in this patterning step.

The inorganic EL display device 100 was manufactured by the above process.

Figure 6:
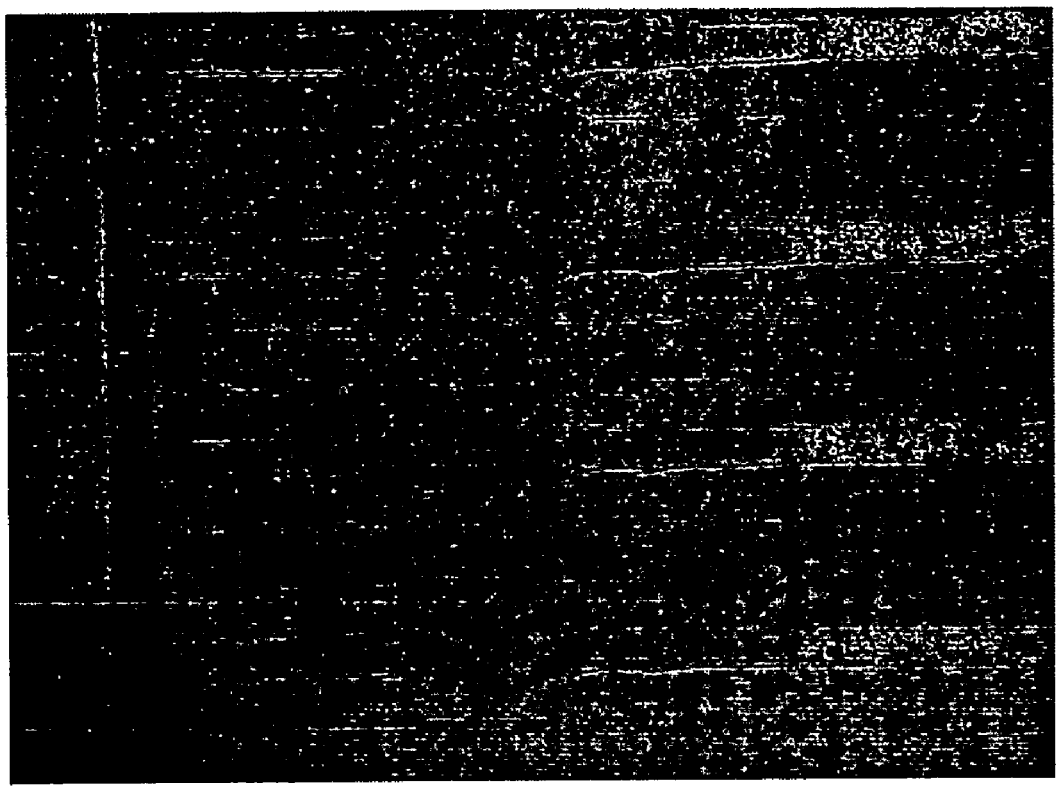
FIG. 6 is a two-dimensional photograph of an inorganic EL display device according to an example of the present invention.

FIG. 6 is a two-dimensional photograph of the inorganic EL display device 100 manufactured by the above process.

As shown in FIG. 6, in the inorganic EL display device 100 of this example, the protruding layers 150 and the portions of the second electrodes 140 which are formed on the protruding layers 150 were hardly over-etched. This inorganic EL display device 100 had reliable electric connection between the first electrodes 120 and the second electrodes 140.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A display device, comprising:
   a substrate;
   a plurality of first electrodes extending in parallel to each other on the substrate;
   a light-emitting lamination covering the plurality of first electrodes;
   a plurality of second electrodes extending across the light-emitting lamination and extending in parallel to each other at an angle with respect to an extending direction of the first electrodes; and
   one or more protruding layers formed on the substrate and protruding from a side end of the light-emitting lamination in an extending direction of the second electrodes, wherein
   respective portions of the plurality of second electrodes which extend outside of the light-emitting lamination are formed on the one or more protruding layers, and wherein
   the one or more protruding layers are at least substantially coplanar with said first electrodes and are overlapped by a light-emitting layer of said light-emitting lamination.

2. A display device, comprising:
   a substrate;

a plurality of first electrodes extending in parallel to each other on the substrate;

a light-emitting lamination covering the plurality of first electrodes; and a plurality of second electrodes extending across the light-emitting lamination and extending in parallel to each other at an angle with respect to an extending direction of the first electrodes, wherein respective portions of the plurality of second electrodes which extend outside of the light-emitting lamination are formed on one or more protruding layers protruding from a side end of the light-emitting lamination in an extending direction of the second electrodes, and wherein the one or more protruding layers are substantially covered by the respective portions of the plurality of second electrodes which extend outside of the light-emitting lamination, and are a plurality of bars extending in parallel to each other in an extending direction of the second electrodes.

3. A display device, comprising:

a substrate;

a plurality of first electrodes extending in parallel to each other on the substrate;

a light-emitting lamination covering the plurality of first electrodes; and a plurality of second electrodes extending across the light-emitting lamination and extending in parallel to each other at an angle with respect to an extending direction of the first electrodes, wherein respective portions of the plurality of second electrodes which extend outside of the light-emitting lamination are formed on one or more protruding layers protruding from a side end of the light-emitting lamination in an extending direction of the second electrodes, and wherein the one or more protruding layers are substantially covered by the respective portions of the plurality of second electrodes which extend outside of the light-emitting lamination, and have a hollow quadrangular shape.

4. A display device, comprising:

a substrate;

a plurality of first electrodes extending in parallel to each other on the substrate;

a light-emitting lamination covering the plurality of first electrodes; and a plurality of second electrodes extending across the light-emitting lamination and extending in parallel to each other at an angle with respect to an extending direction of the first electrodes, wherein respective portions of the plurality of second electrodes which extend outside of the light-emitting lamination are formed on one or more protruding layers protruding from a side end of the light-emitting lamination in an extending direction of the second electrodes, and wherein the one or more protruding layers are substantially covered by the respective portions of the plurality of second electrodes which extend outside of the light-emitting lamination, and have a ring shape.

5. A display device, comprising:

a substrate;

a plurality of first electrodes extending in parallel to each other on the substrate;

a light-emitting lamination covering the plurality of first electrodes; and a plurality of second electrodes extending across the light-emitting lamination and extending in parallel to each other at an angle with respect to an extending direction of the first electrodes, wherein respective portions of the plurality of second electrodes which extend outside of the light-emitting lamination are formed on one or more protruding layers protruding from a side end of the light-emitting lamination in an extending direction of the second electrodes, and wherein the one or more protruding layers are substantially covered by the respective portions of the plurality of second electrodes which extend outside of the light-emitting lamination, and are a plurality of "V-shaped" bars extending in parallel to each other.

6. The display device according to any one of claims 1 and 2 to 5, wherein a thickness of the one or more protruding layers is about $\frac{1}{10}$ to about $\frac{1}{2}$ of a thickness of the light-emitting lamination.

7. The display device according to any one of claims 1 and 2 to 5, wherein a protruding length of the one or more protruding layers is about 2 mm or more.

8. The display device according to any one of claims 1 and 2 to 5, wherein the one or more protruding layers are formed from a same material as that of the first electrodes.

9. The display device according to any one of claims 1 and 2 to 5, wherein the display device is of an inorganic luminescent display type.

* * * * *